(No Model.) 2 Sheets—Sheet 1.
J. NORTH.
PUMP.
No. 380,510. Patented Apr. 3, 1888.
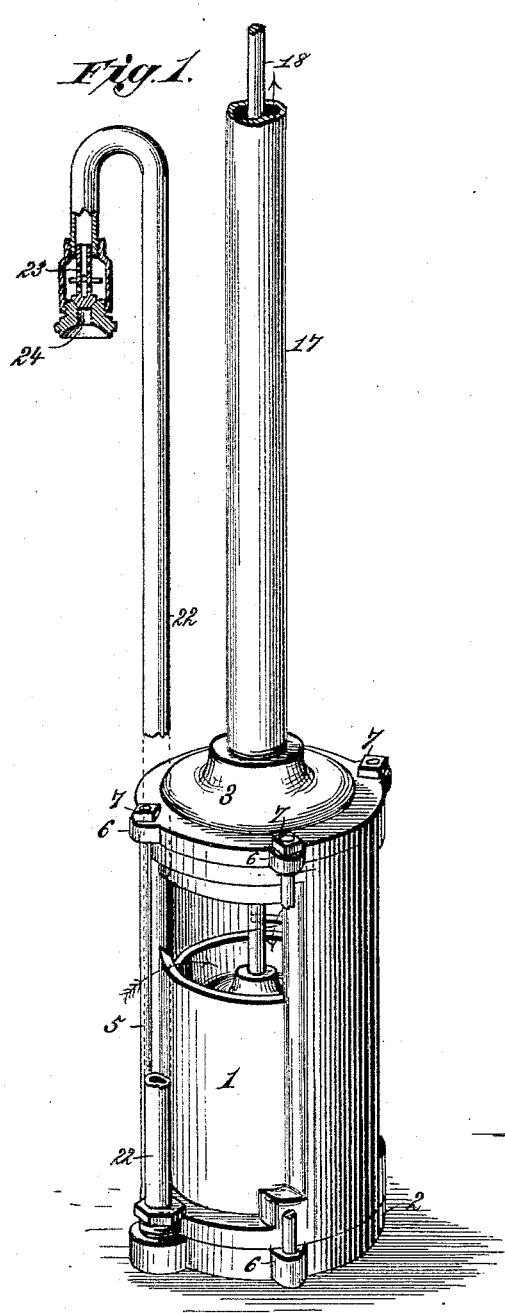
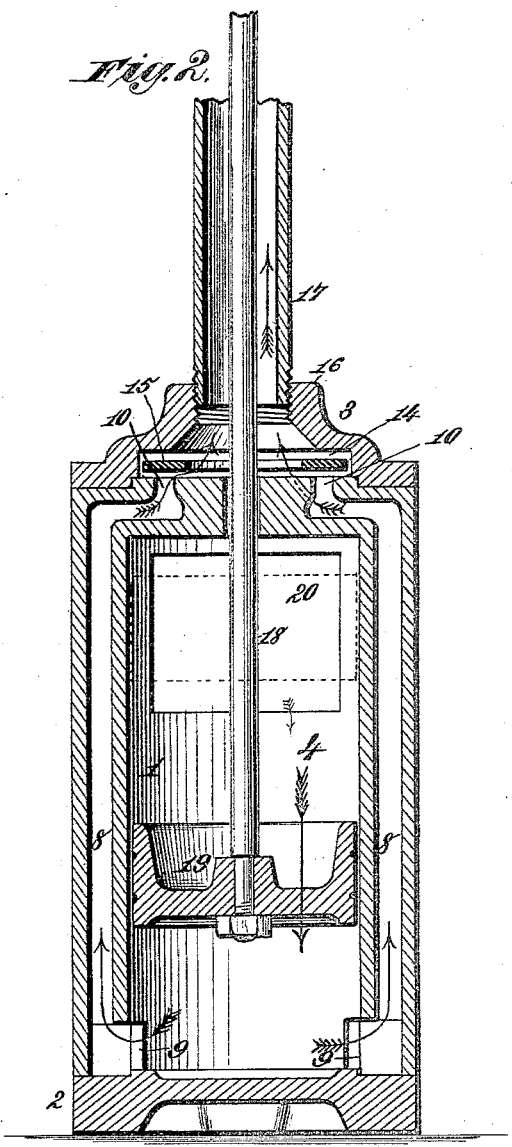
Witnesses.
Robert Everett.
J. A. Rutherford.
Inventor:
John North.
By James L. Norris,
Atty.
N. PETERS, Photo-Lithographer, Washington, D. C.

(No Model.) 2 Sheets—Sheet 2.
J. NORTH.
PUMP.
No. 380,510. Patented Apr. 3, 1888.
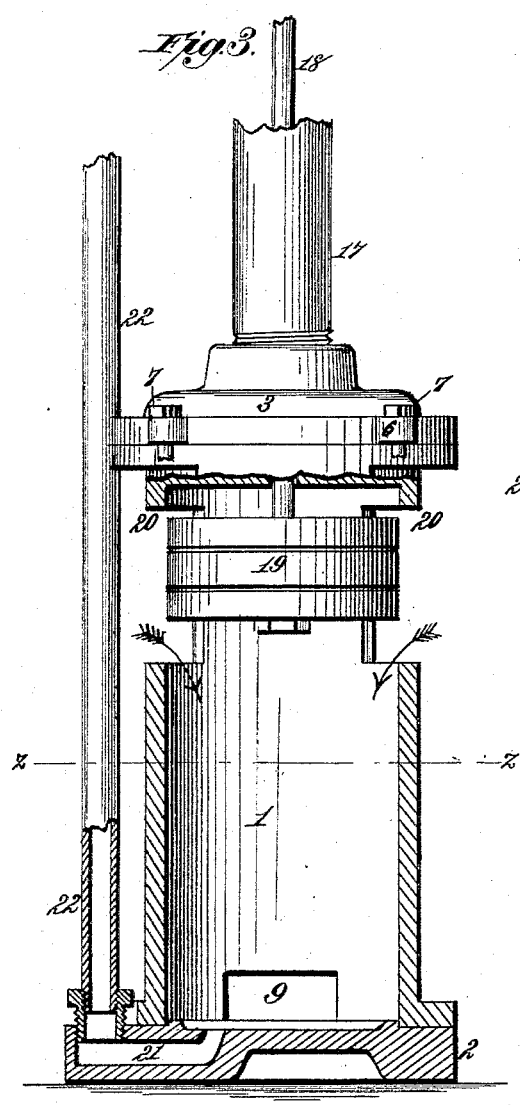
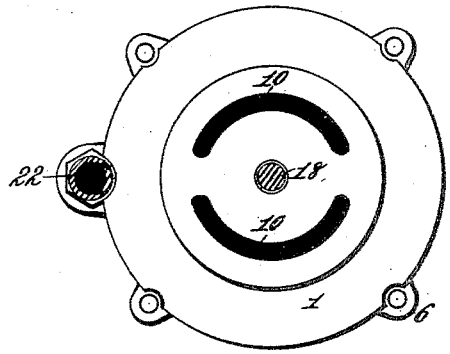
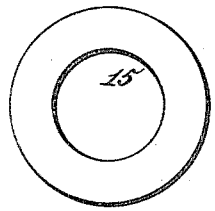
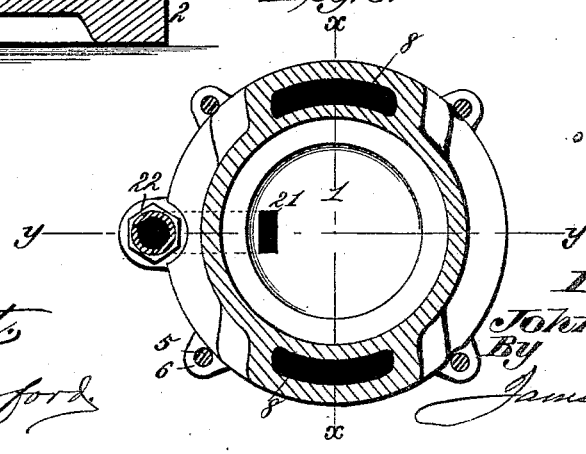
Witnesses.
Robt Everett,
J. A. Rutherford
Inventor:
John North.
By James L. Norris.
Atty.
N. PETERS, Photo-Lithographer, Washington, D. C.

UNITED STATES PATENT OFFICE.

JOHN NORTH, OF MIDDLETOWN, CONNECTICUT.

PUMP.

SPECIFICATION forming part of Letters Patent No. 380,510, dated April 3, 1888.

Application filed December 6, 1887. Serial No. 257,134. (No model.)

*To all whom it may concern:*

Be it known that I, JOHN NORTH, a citizen of the United States, residing at Middletown, in the county of Middlesex and State of Connecticut, have invented new and useful Improvements in Pumps, of which the following is a specification.

My invention relates to hand-pumps, and the purpose thereof is to provide a simple and efficient apparatus whereby the stagnant waters of cisterns and other similar reservoirs may be purified if they have been allowed to become foul, or, if fresh, may be preserved in a perfectly pure and sweet state.

In certain parts of country the water-supply is obtained either wholly or in a very great part from cisterns or other reservoirs in which surface-water is collected. When the accumulated supply is allowed to stand and is not subjected to frequent agitation to bring the air into contact with all portions, various forms of vegetable and animal life are speedily generated, and the confervoid growth upon the surface not only gives a most unpleasant appearance, but the rapid decay of vegetation renders the water unpleasant to the taste and dangerous to health. Such a reservoir will in time render the vicinity exceedingly dangerous by reason of the zymotic diseases produced thereby, as well as producing odors which are always unpleasant and often extremely foul.

The use of a chain-pump, by which a considerable agitation of the water is produced and more or less air carried down beneath the surface of the reservoir, will tend to prevent the formation of such growths and keep the waters pure and sweet. The mechanism of such pumps, however, is expensive and the labor required to operate them is excessive, as compared with the water raised. Moreover, these pumps wear out rapidly, and are not practically operative beyond certain depths, since the water raised by the buckets will run back if the distance the buckets have to travel is more than the average depth. Besides, these pumps do not force sufficient air beneath the water-surface to remove the vegetable growths accumulating and prevent their re-formation. It is my purpose, therefore, to remedy these objections by providing a pump of comparatively inexpensive construction, whereby water may be forced to any height, and whereby, also, a body of air is at each stroke drawn into the pump and caused to circulate through the surrounding water, rising from the bottom of the cistern or reservoir to the surface, the abundant supply of air thus carried to the bottom and diffused through the surrounding water giving a large supply of oxygen and practically sufficient agitation to keep the waters perfectly sweet and wholesome, or to speedily render them so if the cistern is already foul. It is also my purpose to provide a pump having but a single valve, in which no packing is required, and wherein the friction of the parts is greatly diminished and the wear of the pump correspondingly prolonged. It is also my purpose to improve and simplify the construction of single-acting pumps, whereby the cost of production is materially reduced, the durability enhanced, and the force and yield of the water increased in a marked degree.

The invention consists in the several novel features of construction and new combinations of parts hereinafter fully set forth, and specifically pointed out in the claims.

In the accompanying drawings, Figure 1 is a perspective view, partly in section, of the complete pump. Fig. 2 is a central vertical section taken in the plane $x\ x$ of Fig. 6. Fig. 3 is a view, partly in elevation and partly in section, the section being taken in the plane $y\ y$, Fig. 6. Fig. 4 is a plan view of the cylinder with the cap and valve ring removed. Fig. 5 is a plan view of the valve-ring. Fig. 6 is a transverse section of the pump-cylinder, taken in the plane $z\ z$ of Fig. 3.

In the said drawings the reference-numeral 1 denotes the pump-cylinder, which is formed of three parts—a base, 2, a cap, 3, and a barrel, 4, between the cap and base. These parts are united by the rods 5, passing through lugs 6, formed on the cap and base, and receiving nuts 7 on their ends.

In the barrel 4, having oppositely-thickened walls, I form water-ways or passages 8, entering the lower end of the cylinder or barrel by ports 9. At the upper end, which is thickened for this purpose, the water-ways 8 are directed inward and then upward, and are provided with ports 10, which are each curved in the arc of a circle described from a central opening, 12, in the end of the barrel. The upper end of the cylinder is closed by a cap, 3, having a valve-chamber, 14, in which lies a valve, 15, having substantially the form of a flat ring, as shown in Figs. 2 and 5. This valve rises with the current, opening and closing both ports simultaneously. A central boss, 16, is formed upon the cylinder-cap 3, and provided with a threaded opening to receive the exit or delivery pipe, 17. Through this pipe passes the piston-rod 18, having a piston-head, 19, reciprocating in the cylinder.

At the upper part of the cylinder 4, on opposite sides thereof, I form openings 20, cut in the wall of the barrel. In the base of the cylinder is formed an air-passage, 21, communicating with the interior of the barrel, and with an air-pipe, 22, which rises alongside the cylinder 1 to a point above the surface of the water. At its upper end a valve, 23, is placed in the pipe and seats upon a port, 24, by which air is allowed to flow into the barrel at each upward stroke of the piston. It is evident that this valve may be of any ordinary construction, and may be located at any convenient point. I have shown the end of the air-pipe as curved over to form a depending branch, in which the valve is arranged; but the location and form of these parts are entirely matters of convenience in construction, and do not enter into my present invention.

The pump being submerged in the cistern and resting on the bottom thereof, when the piston is reciprocated, the water is, upon the downward stroke, forced up the passages 8, through the valve-chamber in the cap, and into the exit-pipe. At the same time water enters by the openings 20 and fills the barrel above the piston. As the latter rises air is drawn through the pipe 22 and fills the barrel beneath the piston, while the rise of the latter expels the superimposed body of water, which flows out through the openings 20, producing more or less agitation in proportion to the rapidity of the stroke. As the piston rises above the openings 20, the water from the reservoir flows in by gravity, displacing the air, which rises to the surface, and filling the barrel preparatory to the ensuing downward stroke. The initial downward movement of the piston produces a further agitation by the lateral displacement of the water between the piston and the edges of the openings 20. By this pump stagnant water filled with confervaceous growths may be purified and rendered sweet and wholesome, and any reservoir having such a pump will be at all times in a proper sanitary condition and its water fit for use as a beverage.

The pump constructed as set forth requires no packing, will not rust, and the friction being reduced to a minimum the pump will work until entirely worn out. Moreover, the water is raised to the spout almost instantly after the first stroke, and when the piston is arrested the water will run gradually back through the unpacked opening in the end through which the piston-rod 18 passes, thereby preventing the water from freezing in the pipe.

The pump constructed in accordance with my invention possesses not only the sanitary advantages hereinbefore specified, as well as the several points of economic superiority described, but it is of greatly less cost.

What I claim is—

1. A submerged pump having an air-pipe communicating with its interior beneath the piston and provided with openings in the wall of the barrel above which the piston rises at each stroke to admit the inflow of water and the escape of the air, said pump having waterways communicating with the barrel at the bottom thereof and a valve closing said ways, substantially as described.

2. A submerged pump having an air-pipe communicating with its interior beneath the piston and provided with water-passages in the wall of the barrel leading to an exit-pipe, a single valve closing said passage and with openings cut through said wall and extending below the limit of the upward stroke, a piston moving in the pump-barrel, and a valve closing the water-ways at the upward stroke, whereby the cylinder is filled with air at each stroke and the latter displaced by water flowing in by gravity, substantially as described.

3. The combination, with the pump-cylinder having water-passages in its walls and openings cut through said walls, of a piston moving in the cylinder, an air-pipe entering the base and rising above the surface and provided with a valve closing at the downward stroke, and a ring-valve arranged in the chambered cap of the cylinder and closing the water-passages, the openings cut through the walls of the cylinder being extended below the highest point to which the piston rises, substantially as described.

4. The combination, with the cylinder having passages in its walls, said passages leading from the lower end of the interior to a central exit at the other end, of a piston reciprocating in the cylinder, an annulus-valve closing the water-passages, an air-pipe leading from a point above the surface to the interior of the cylinder beneath the piston, and a valve closing the air-passage at the downward stroke, the piston-rod being arranged to reciprocate in the exit-pipe and the cylinder having openings cut through the same above its center, substantially as described.

In testimony whereof I have affixed my signature in presence of two witnesses.

JOHN NORTH.

Witnesses:
JAMES L. NORRIS,
J. A. RUTHERFORD.